May 30, 1972 W. CYRIAX 3,666,387
MOLD-CLOSURE MEANS

Filed Nov. 26, 1969 2 Sheets-Sheet 1

Wilhelm CYRIAX
Inventor:

BY
ATTORNEY

United States Patent Office 3,666,387
Patented May 30, 1972

3,666,387
MOLD CLOSURE MEANS
Wilhelm Cyriax, W. R. Neustadter Str. 81,
Kottingbrunn, Austria
Filed Nov. 26, 1969, Ser. No. 880,115
Claims priority, application Germany, Dec. 13, 1968,
P 18 15 712.5-24
Int. Cl. B29f 1/06
U.S. Cl. 425—242
2 Claims

ABSTRACT OF THE DISCLOSURE

An expandable unit, carried on a fixed end plate of an injection-molding machine to exert mold-closing pressure upon a movable platen, comprises a pressure box on the end plate whose piston supports an elongate thrust member composed of threadedly interconnected portions to enable adjustment of its effective length. The entire unit is transversely slidable along a track on the end plate into a retracted position beyond the outline of the movable platen whereby the latter more closely approaches the end plate upon the opening of the mold.

FIELD OF THE INVENTION

The invention relates to mold-closure means for molds, particularly for the transfer molding and injection molding of metals and plastics.

Known mold-closure means commonly employ a fixed mold-carrier plate or platen carried on stays, a fixed end plate and a displaceable platen or mold-carrier plate adapted to be moved between the aforementioned plates from a mold-open position to a mold-closed position. One such construction comprises two pistol-cylinder arrangements or jacks acting on the fixed platen or on the end plate to effect the closing and opening movements of the mold under comparatively low pressure. In order to produce the required mold-closing pressure during injection, a pressure member with a pressure box is provided between the movable platen and the end plate, connecting the fixed end plate with the movable platen during injection only. In this device, equipped with lateral closing cylinders for the mold platens a pressure box is mounted on the end plate, while the pressure member for transferring the closing pressure to the movable platen is adapted to pivot laterally to enable the mold to be opened. In view of the fixed central arrangement of the pressure box on the end plate, this construction always requires central adjustment of the pressure member, making it necessary to arrange the mold symmetrically to the center line of the movable platen. With molded parts which necessitate a lateral injection in the dividing plane of the mold, the cavity formed by the two halves of the mold and corresponding to the molded article must be located outside the midplane of the movable platen. Hence, the known construction makes it necessary that the mold be unnecessarily large, since, owing to the required central arrangement of the pressure member, it must be designed symmetrically about the center line of the movable platen. Further, the end plate supporting the pressure box has a complicated construction, owing to the required configuration, which makes the end plate expensive, due on account of additional machining operations required therefor. Besides, the known construction prevents the use of an ejector mounted centrally in the end plate, because this device would have to pass through the pressure box and this arrangement would present difficult sealing problems which could not completely eliminate leakage losses in the pressure box.

Moreover, the pressure box also has the object of compensating differences in stroke length occurring in consequence of different opening widths of the mold with a pressure member of constant length. This makes necessary the provision of a pressure box with a large stroke volume so that the closing pressure must be transmitted by a large column of pressure medium whereby owing to the compressibility of the hydraulic medium, the substantially larger amount of fluid is required than would correspond to the stroke. The same considerations apply if the pressure medium is constructed as a conventional piston-cylinder unit or jack.

Another known device has a pressure box which is transversely displaceable relative to the end plate, in order to allow for travel of the pressure member arranged on the pressure side of the movable platen. In this construction, the end state must have a hole corresponding to the dimensions of the pressure member so that this member may pass through the fixed end plate when the mold is opened. This opening in the end plate entails a weakening of the plate, requiring in turn a sufficiently strong construction of the base of the movably mounted pressure box. If, in the known construction, the pressure member is adapted to be displaced transversely to the movable platen, the fixed end plate must be provided with an oblong hole or slot so that the pressure member may pass through the end plate when being disposed eccentrically relative to the movable platen, thereby causing a further weakening of the end plate. Furthermore, it is necessary to adjust the movably mounted pressure box synchronously with the adjustment of the pressure member relative to the movable platen so that the pressure member acts coaxially with the pressure box. This construction also requires a comparatively great structural length of machine, because the space for the passage of the pressure member through the end plate must be made available. With the arrangement of an ejector centrally of the end plate, the actuating member of the ejector must be located at such a distance from the rear side of the end plate that, when the mold is opened, the pressure member may pass through the end plate without obstruction. This causes a further increase in the structural length of the machine.

SUMMARY OF THE INVENTION

In accordance with this invention I provide, in a molding machine of the type described, an expandable unit comprising a pressure box and a pressure member, adapted to move jointly out of the path of travel of the movable platen when the mold is opened.

In a mold which requires lateral injection, the cavity formed by the two halves of the mold and corresponding to the shape of the pressed article is offset to one side relative to the center line of the platen, in which the injection nozzle and the injection cylinder are arranged. The injection into one half of the mold is effected along the center line of the mold carrier plates via a passage extended into a unilateral channel located in the parting plane of the mold and terminating at the mold cavity. The construction according to the invention makes it possible so to adjust the pressure member between the fixed end plate and the movable platen that it is symmetrical to the center line of the mold cavity. In this manner, the mold itself may be made smaller since it need no longer be arranged symmetrically to the center line of the platens. Thus, the two halves of the mold may be reduced in size in so far as they need only be symmetrical to the center line of the mold cavity. This is achieved according to the feature of the invention that the pressure box and the pressure member are constructed as an integral component. Only a single actuating element is required for moving this component, because the pressure box and the pressure member are actuated simultaneously and are, therefore, always in coaxial alignment. The invention minimizes the structural length of the machine, because both the pressure box and the pressure member are moved out of the path of the displaceable platen when the mold is opened. The end plate may be parallel-sided and solid, thereby reducing the manufacturing costs. With the provision of a central ejector designed to bear upon a runner, an actuating element for this ejector may be mounted directly on the rear side of the end plate because during the opening of the mold the pressure member does not pass through the end plate, owing to its movement out of the path of the platen.

According to a further feature of the invention, a surface of the fixed end plate facing the movable mold carrier plate carries guide members along which the pressure box moves into and out of its operating position under the control of an actuating member, such as a crank drive or a piston-cylinder arrangement, located on the end plate outside the path of the movable platen and acting laterally upon the pressure box. According to yet another feature, the pressure member may be a telescopingly and threadedly interengaged nut-and-spindle assembly for the stepless adjustment of its length to accommodate molds of different length so that the pressure member can maintain a constant small stroke and the disadvantage occurring with longer strokes because of the compressibility of the pressure medium are avoided.

Finally, an ejector disposed centrally on the rear side of the end plate may be operated by a cylinder mounted directly on the surface of the end plate. According to a further feature of the invention, the face of the movable mold carrier plate confronting the end plate may be provided with a semi-annular abutment, adjustable in the direction of movement of the unitary pressure-exerting component, for supporting the end of the pressure member in the operating position. Furthermore, in the case of machines equipped with large-area platens, there may be provided a plurality of components movable in mutually parallel, opposite or perpendicular directions. If a single central component were used with large-area platens, the travel of this component inward and outward between the end plate and the movable platen would be excessively long. Preferably, several pressure components are then provided instead of a single component, because these components have a shorter travel and the output of the machine is increased. The number of these pressure components is determined by the closing pressure of the machine.

DESCRIPTION OF THE DRAWING

The invention will be further described by way of example with reference to the accompanying drawing in which.

SPECIFIC DESCRIPTION

Figure 2:
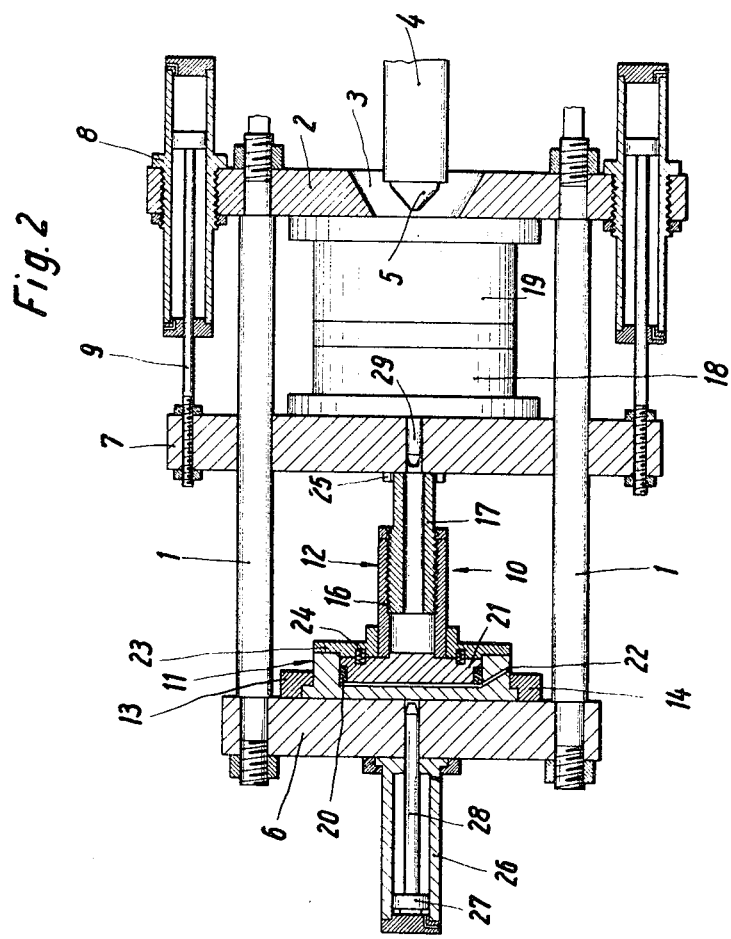
FIG. 2 is a horizontal cross-section of the assembly of FIG. 1.
Figure 1:
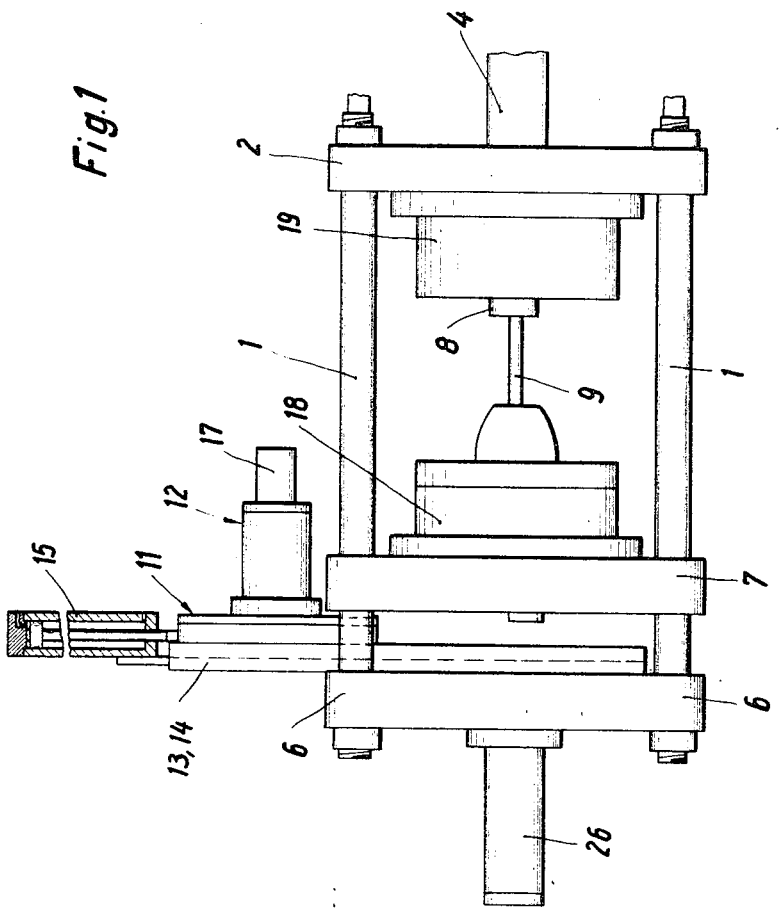
FIG. 1 is a side elevation of mold-closure means according to the invention with a front mold-closing cylinder omitted.

FIG. 1 shows the device with the mold opened and FIG. 2 shows it with the mold closed. Stays or tie rods 1 carry at one end a fixed platen 2 formed with a central aperture 3 for an injection cylinder 4 and an injection nozzle 5. At the other end of the stays 1, there is a fixed end plate 6. Between the platen 2 and the end plate 6 the rods 1 support a movable platen 7. For opening and closing the mold, the fixed platen 2 is provided with two cylinders 8 whose piston rods 9 are fixed to the movable platen 7. Pressure-applying means 10, consisting of a pressure box 11 and a pressure member or thruster 12 which together form a single expandable unit, is mounted between the end plate 6 and the moveable platen 7. The surface of the end place 6 facing the moveable platen 7 is equipped with two guides 13 and 14 slidably mounting the unit 10 on the end plate 6. This movement of unit 10 is caused by a piston-cylinder assembly or jack 15 mounted on the end plate 6 and acting laterally on the pressure box 11. The pressure member 12 consists of a nut 16 and a spindle 17 making possible a stepless adjustment of the length of the pressure-applying means 10 to accommodate molds of different height determined by the mold halves 18 and 19 so that the pressure box 11 has always to carry out a constant stroke. The pressure box 11 consists of a cylinder 20 with a base and a piston 21. A supply conduit 22 for pressure medium leads into the cylinder 20. On the other side of the piston 21, a cover 23 is mounted on the cylinder 20 and contains return springs 24 which retract the piston when pressure in the box 11 is released. The surface of the movable platen 7 facing the end plate 6 is provided with a semi-annular lug 25, serving as an abutment for the spindle 17 of the pressure member 12 and engaging the end of the spindle. This semi-annular lug 25 is shiftable in the direction of movement of the element 10 so that it is effective also in an eccentric working position of the element 10. The rear side of the end plate 6 carries a cylinder 26 whose piston 27 has a piston rod 28 which, when the mold is open, directly engages the ejector 29 of the movable platen 7 to discharge the runner with the molded part from the mould when the piston 27 is operated.

The operation of the device is as follows. When, according to FIG. 2, after the production of a molded article, the closed halves 18, 19 of the mold are opened to release the article, the cylinder 15 is operated whereby the element consisting of the pressure box 11 and the pressure member 12 is moved along the guide rails 13, 14 out of the path of the movable platen 7, enabling that to be shifted to the end plate 6. When the platen 7 has come to rest on the guide rails, the cylinder 26 is actuated, causing the piston rod 28 to engage the ejector 29 of the platen 7 and the molded part to be ejected from the cavity. Then, the jack 8, 9 moves the platen 7 into the closed position shown in FIG. 2 and the element 10 is returned to the position shown in FIG. 2 by operating the actuating means or jack 15, the spindle 17 of the pressure member 12 being adjusted to the given height of the mold. By pressurizing the piston 21 of box 11, the required closing pressure is exerted on the platen 7. When the mold has been filled through the injection nozzle 5 and the molded part has solidified in the mold, the pressure in box 11 is released. The piston 21 returns into the inoperative position under the action of the springs 24 whereupon the element 10 is moved back into the laterally offset position shown in FIG. 1 so that the platen 7 can be moved into the open position.

I claim:
1. In a molding machine wherein a fixed end plate and a stationary platen are spanned by a set of tie rods supporting a movable platen, the combination therewith of:
   an expandable unit on the side of the said plate proximal to said movable platen, said expandable unit comprising a pressure box with two interengaging parts relatively movable parallel to said tie rods under fluid pressure and an elongate thrust member integral with one of said parts extending toward said movable platen;
   guide means on a face of said end plate confronting said movable platen, said guide means forming a track transverse to said tie rods extending laterally to a sufficient extent to let said expandable unit move beyond the outline of said movable platen; and
   actuating means on an outwardly projecting extremity of said guide means coupled with said expandable unit for selectively displacing same across said face between an operating position in line with said movable platen and a retracted position laterally offset therefrom enabling said movable platen to approach close to said end plate, said elongate thrust member consisting of threadedly interconnnected portions enabling adjustment of its effective length.

2. The combination defined as in claim 1, further comprises ejector means on said movable platen and piston means on said plate aligned with said ejector means, said piston means having a rod engageable with said ejector means for operating same upon displacement of said expandable unit into said retracted position.

References Cited

FOREIGN PATENTS

| 1,153,750 | 10/1957 | France | 18—30 LM |
| 1,127,069 | 4/1962 | Germany | 18—30 LM |

J. HOWARD FLINT, JR., Primary Examiner

U.S. Cl. X.R.

425—444